United States Patent [19]

Holley

[11] Patent Number: 4,838,527
[45] Date of Patent: Jun. 13, 1989

[54] CONVERTIBLE GAS SPRING

[75] Inventor: David M. Holley, Whitmore Lake, Mich.

[73] Assignee: Power Components, Inc., Redford, Mich.

[21] Appl. No.: 148,577

[22] Filed: Jan. 26, 1988

Related U.S. Application Data

[63] Continuation-in-part of Ser. No. 21,324, Mar. 3, 1987, abandoned.

[51] Int. Cl.⁴ ............................ F16F 9/34; F16F 9/36; F16F 9/43; F17D 1/20
[52] U.S. Cl. .................... 267/64.28; 267/119; 267/130; 188/322.14; 188/322.21; 137/596
[58] Field of Search ............... 267/64.28, 119, 130, 267/64.11; 188/322.14, 322.21; 137/596, 102

[56] References Cited

U.S. PATENT DOCUMENTS

| Re. 25,027 | 8/1961 | Williamson | 267/119 |
| 2,938,718 | 5/1960 | Williamson | 267/119 |
| 3,085,530 | 4/1963 | Williamson | 267/119 X |
| 3,124,343 | 3/1964 | Williamson | 267/119 |
| 3,147,962 | 9/1964 | Williamson | 267/119 |
| 4,550,899 | 11/1985 | Holley | 267/64.28 X |
| 4,635,466 | 1/1987 | Seki et al. | 267/119 X |
| 4,662,616 | 5/1987 | Hennells | 188/322.21 X |
| 4,664,362 | 5/1987 | Hennells | 267/119 |
| 4,709,724 | 12/1987 | Williams | 137/596 |
| 4,742,997 | 5/1988 | Wallis | 267/64.28 X |

FOREIGN PATENT DOCUMENTS

| 2006028 | 12/1969 | France | 188/322.14 |
| 0249809 | 11/1986 | Japan | 188/322.14 |
| 0137125 | 1/1920 | United Kingdom | 267/64.11 |

Primary Examiner—Andres Kashnikow
Assistant Examiner—Richard Potosnak
Attorney, Agent, or Firm—Barnes, Kisselle, Raisch, Choate, Whittemore & Hulbert

[57] ABSTRACT

A gas spring with a piston rod slidably received in a cylinder which defines a chamber in which a gas is compressed when the rod is forced into the cylinder. The gas spring can be operated with either an external source of gas or as a precharged and self-contained unit by changing first and second valves assemblies either of which can be installed in the same cavity in the cylinder. If desired, a check valve can control the bleeding of gas under pressure in the cylinder back to the entrance of the cavity containing one of the valve assemblies through which the cylinder is filled with gas.

42 Claims, 4 Drawing Sheets

U.S. Patent  Jun. 13, 1989  Sheet 1 of 4  4,838,527 though this application is a continuation-in-part of U.S. application Ser. No. 021,324 filed on Mar. 3, 1987 and abandoned in favor of this application.

CONVERTIBLE GAS SPRING

RELATED APPLICATION

This application is a continuation-in-part of U.S. application Ser. No. 021,324 filed on Mar. 3, 1987 and abandoned in favor of this application.

FIELD

This invention relates to pneumatic devices, and more particularly to a gas spring which yieldably resists movement of 17a body, such as a clamping ring of a die assembly for forming sheet metal parts.

BACKGROUND

Previously, self-contained gas springs have been constructed with an actuating rod connected to a piston slidably received in a cylinder having a chamber which is precharged at a predetermined pressure, such as 2,000 psi, with an inert gas such as nitrogen. When the rod and piston are forced into the chamber, the gas therein is compressed to a maximum operating pressure which is usually in the range of about 3,000 to 5,000 psi, depending on the volume of the chamber and the effective area and stroke of the piston. In normal use, the pressure to which a self-contained gas spring is initially charged is not varied or changed. The spring is initially charged, relieved and recharged through a high pressure poppet core valve of the type commonly used for aircraft struts and accumulators.

Previously, a plurality of gas springs each having a chamber port connected to an external gas source also have been used. Each chamber port was connected to a common manifold by a flexible hose so that all of the chambers could be charged with gas to the same pressure from a common source of gas at a high pressure such as a tank. This manifold permits the pressure to which the spring chambers are charged to be varied, controlled and, as needed for different applications, changed from time to time. However, when the gas springs are used, the interconnecting hoses are subjected to pressure surges, fluctuations and heating which eventually produces leaks and ruptures. Thus, these manifold systems require considerable maintenance and repair and shielding of the hoses and pipes to avoid potential safety hazards, if they rupture. Moreover, in use, several gas springs can produce such large pressure surges and generate so much heat in the working gas that it is usually necessary to utilize surge tanks in the system to decrease the extent of the pressure surges and dissipate sufficient heat so that the maximum pressure of the working gas does not exceed a safe maximum level and result in rupturing or damaging of the springs, hoses or pipes of the system. In some of these systems check valves have also been used to decrease gas surges.

SUMMARY

In accordance with this invention, the same gas spring can be readily converted to either a self-contained unit or an external source unit by changing interchangeable valve assemblies either of which can be installed wholly within the same cavity of the spring. The self-contained valve assembly has a normally closed inlet filler valve which preferably is opened to relieve the gas pressure when a tool is inserted to remove it from the spring. Preferably, initial movement of this valve assembly to remove it from the gas spring also opens a by-pass passage to relieve the gas pressure if the filler valve malfunctions and fails to do so when engaged by the tool.

To prevent pressure surges in the feed line when in operation, the external source valve assembly has a normally closed filler valve which prevents variations in the pressure of the working gas within the spring chamber from being transmitted to and through the feed line. Preferably, to permit variation, adjustment and control of the initial charging pressure, the external source valve assembly is controlled by the gas pressure in the feed line to selectively communicate the chamber with a by-pass passage to relieve gas pressure within the chamber. Preferably, the external source valve assembly also controls the maximum pressure to which the gas within the the chamber can be compressed by the spring when in use by selectively relieving the chamber through the by-pass passage to prevent the gas pressure within the chamber from exceeding a predetermined maximum pressure and damaging the gas spring. If desired, when relieving this chamber, the gas can be bled back into the feed line through an auxiliary check valve.

Preferably, the gas spring also has a separate manually operable auxiliary relief valve permitting the gas within the chamber to be relieved to the atmosphere in the event either valve assembly malfunctions or it otherwise becomes desirable to completely relieve the chamber of the spring.

Objects, features and advantages of this invention are to provide a gas spring which can be easily and readily converted and operated as either a self-contained unit or an external supply unit, has interchangeable self-contained and external source valve assemblies, relieves gas under pressure in the spring before a valve assembly is removed to insure maintenance personnel are not exposed to any hazardous conditions when removing a valve assembly, when operated with an external gas source prevents pressure surges in the feed line, limits the maximum pressure of gas in the spring to prevent damage to or rupture of the feed line and spring, and can be relieved back into the feed line, has a long service life and is rugged, durable, reliable, of simplified design and of relatively economical manufacture and assembly.

BRIEF DESCRIPTION OF THE DRAWINGS

These and other objects, features and advantages of this invention will be apparent from the following detailed description, appended claims, and accompanying drawings in which

DETAILED DESCRIPTION

Figure 1:
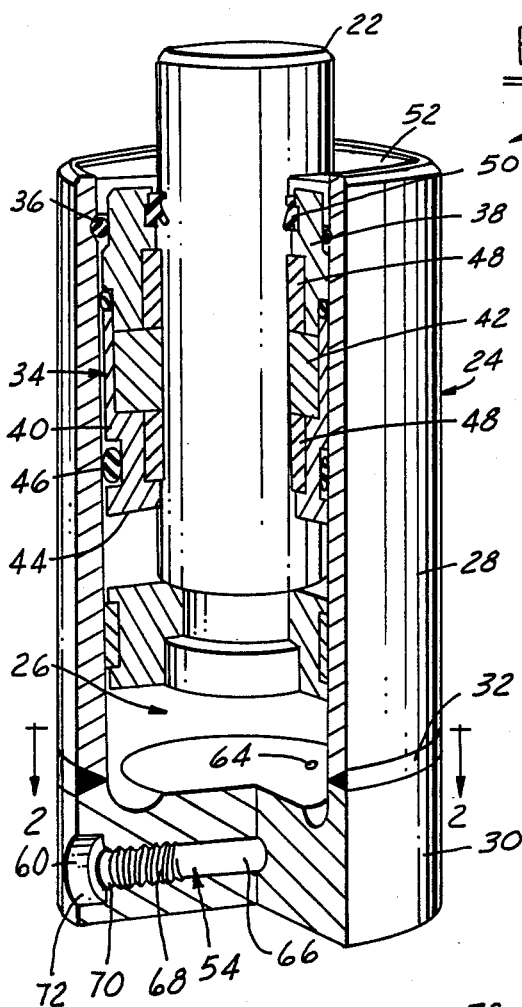
FIG. 1 is an isometric view with portions broken away and in section of a gas spring embodying this invention.
Figure 2:
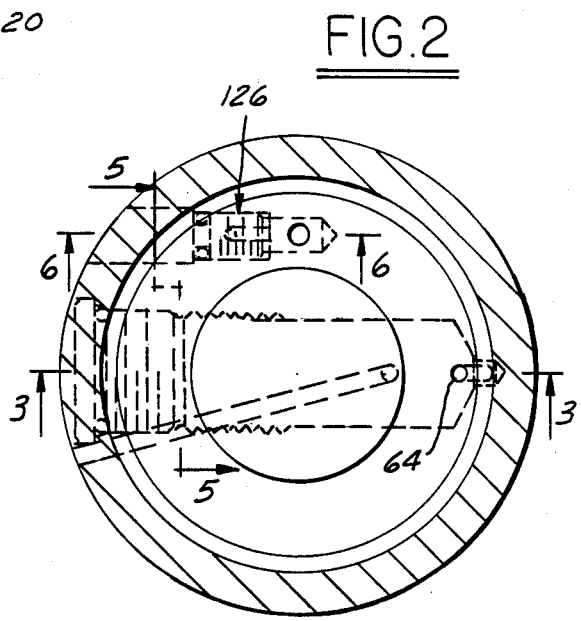
FIG. 2 is a sectional view taken generally on line 2-2 of FIG. 1.

Referring in more detail to the drawings, FIG. 1 illustrates a gas spring 20 embodying this invention. The gas spring has a piston rod 22 slidably received in a cylinder or tube assembly 24 defining a chamber 26 which when charged with a gas under pressure yieldably urges the piston rod to its extended position. This provides a cushion permitting the rod to yield and move toward its retracted position when a force applied externally to the rod exceeds the force produced thereon by the gas in the chamber. Preferably, the cylinder has a separate tube 28 and an end plate or cap 30 permanently fixed to the tube by a circumferentially continuous seam weld 32.

The rod is slidably received in a bearing and retainer assembly 34 received in the tube and releasably retained therein by ring segments 36. This assembly has a front housing 38 slidably received in a rear housing 40 with a rod gasket or seal 42 between them. In use, the gasket 42 is compressed axially so that it expands radially into firm sealing engagement with the piston rod by the force produced by pressurized gas in the chamber acting on the rear face 44 of the rear housing. A seal is provided between the cylinder tube and the rear housing by an O-ring 46 received in a groove in the rear housing.

The rod is slidably received in bearings carried by the housing. Preferably, the bearings 48 are of a suitable metal such as sintered bronze and preferably are impregnated with a lubricant. Preferably, a scraper 50 encircles the rod and is received in a recess in the front housing and a dust cap 52 overlies the bearing assembly and is received and frictionally retained in the end of the tube.

Valve Cavity

Figure 3:
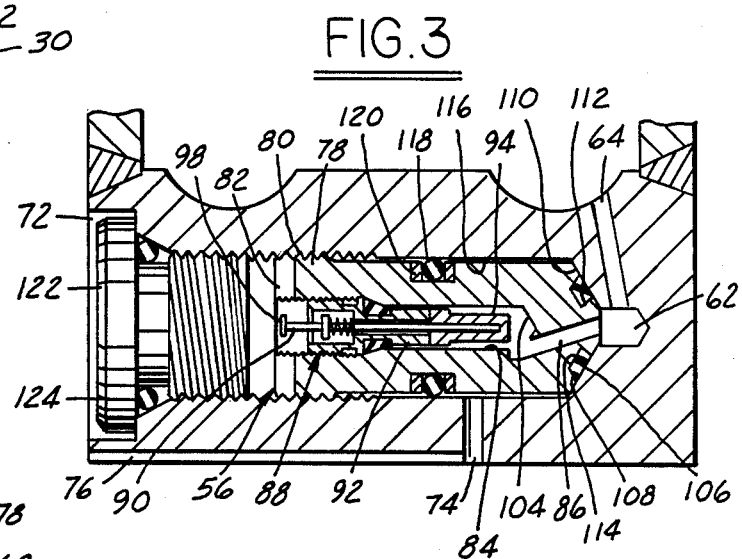
FIG. 3 is a sectional view taken generally on line 3-3 of FIG. 2 and illustrating a valve assembly used when the gas spring functions as a self-contained unit.
Figure 5:
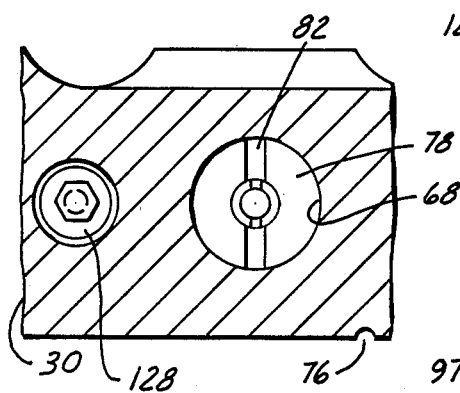
FIG. 5 is a fragmentary sectional view taken generally on line 5—5 of FIG. 2.
Figure 7:
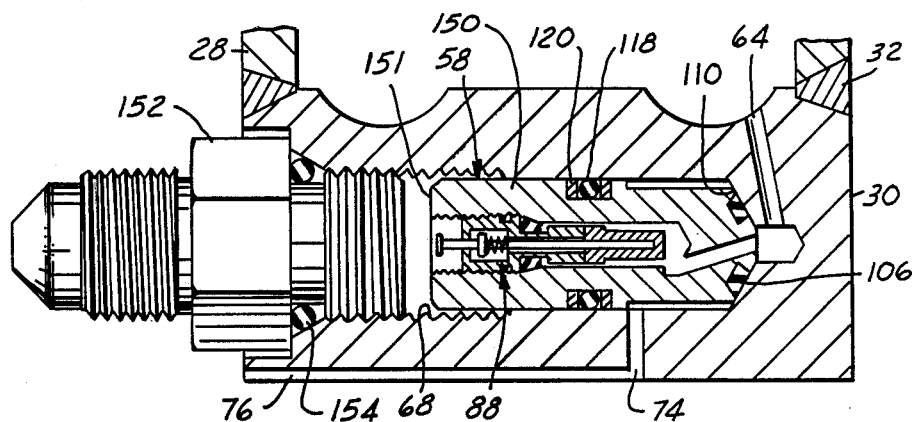
FIG. 7 is a sectional view generally similar to FIG. 3 illustrating a valve assembly used when gas is supplied to the spring through a feed line from an external source.

In accordance with this invention, a valve cavity 54 wholly within the end cap is constructed and arranged to receive one at a time both a self-contained valve assembly 56 (FIG. 3) and an external valve assembly 58 (FIG. 7). The cavity has an entrance 60 and communicates with the gas chamber through a port 62 and an interconnecting passage 64 (FIG. 3). The cavity has a generally coaxial smooth bore 66, threaded portion 68, conical portion 70 and a counterbore 72. To permit bleeding of the gas chamber, the cavity also communicates with the atmosphere through a port 74. So this port can communicate with the atmosphere even if the end cap bears on an underlying support plate (not shown), preferably a groove 76 is provided in the exposed face of the cap.

Self-Contained Valve Assembly

Figure 4:
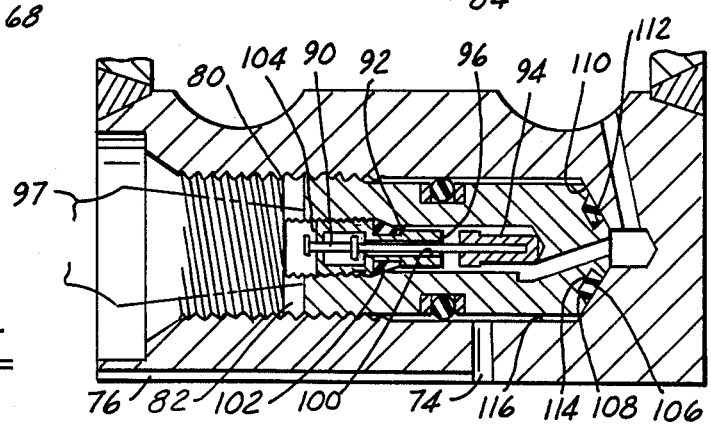
FIG. 4 is a sectional view similar to FIG. 3 illustrating opening of a filler valve to relieve gas under pressure in the spring chamber when a tool is inserted to remove the valve assembly.

As shown in FIGS. 3 and 4, the self-contained valve assembly 56 has a generally cylindrical body 78 with a threaded portion 80 adjacent tone end mating with the threads 68 of the cavity for removably securing the valve assembly in the cavity. To facilitate rotating the valve body with a screw driver for insertion and removal, a recess or slot 82 is provided in the end of the body.

For filling the gas chamber, interconnected bores 84 and 86 define a passage through the body. An inlet poppet valve 88 is removably received in a threaded portion of the bore 84. The poppet valve has a stem 90 slidably received in a generally cylindrical housing 92 and connected to a valve head 94 which is yieldably biased by a spring into normally closed and sealing engagement with a seat 96.

So the poppet valve will be forced open to relieve any pressurized gas in the spring chamber when the blade 97 of a screw drive (FIG. 4) or other tool is inserted in the slot 82, the stem has a head 98 on its other end which is normally disposed in the slot. When the stem is depressed the valve head 84 is displaced from the seat, so gas can flow through a central passage 100 in the housing to the atmosphere. A gasket 102 is received on the housing and provides a seal within body 78. A suitable poppet valve is a filler core valve for airplane struts and accumulators commercially available from Eaton Corporation, Air Control Division, Route 501 South, Roxboro, N.C. 27573 as Part No. 302-DD. These valves are believed to comply with the International Organization for Standards specification ISO 7442-1982(e) Tyre Valves.

To limit the extent to which the poppet valve 88 is opened by the initial in rush of compressed gas so that its component parts, particularly the spring and the stem, will not be damaged, the head bears on a positive stop provided by an end wall 104 of the bore 84. This end wall is positioned so it is engaged by the valve head before the stem head 96 strikes a stop 104 on the valve housing. Since this end wall provides a positive stop for the valve head, the bore 86 is inclined so that it opens into bore 84 adjacent its periphery.

A seal is provided between the valve body and the cavity by an annular gasket 106 received in a groove 108 in the end of the body and bearing on the cavity end wall 110. To insure the gasket is retained in the body, preferably this groove has a reentrant side wall 112 inclined at an acute included angle to the base 114 of the groove. Desirably, this included angle is about 80° to 87° and preferably about 83° to 85° so that its outer edge is radially outboard of its inner edge. Preferably, the seal is also secured by an adhesive, such as Tycel 7001 sold by Lord Corp. of Erie, Pa.. In practice, it has been found that if the inner side wall 112 of the groove 108 is not inclined to provide a reentrant angle there is a tendency for the gasket to be forced out of the groove when pressurized gas in the chamber is bled past the gasket to the atmosphere.

To further protect the gasket and insure a tight seal, preferably in normal use, there is metal to metal contact between the end face of the body 78 and the cavity end wall 110.

To insure that any gas under pressure in the spring chamber is bled to the atmosphere before the valve assembly 56 is removed, even if the poppet valve malfunctions and does not do so, the chamber is bled to the atmosphere when the valve body is rotated sufficiently during removal so that the gasket 106 is disengaged from the cavity end wall 110. Upon disengagement, gas can flow past the gasket into the space 116 between the body and cavity and to the atmosphere via the port 74 and groove 76. The space 112 is formed by a reduced diameter end portion of the body. Preferably, to provide a further seal an O-ring 118 and split washer 120 are received in a groove in the body.

To protect the valve assembly, a cap or screw 122 can be threaded into the cavity after the valve assembly is installed. Preferably, to provide a further seal, an O-ring 124 is received in a groove in the screw and bears on the conical portion 70 of the cavity.

Figure 6:
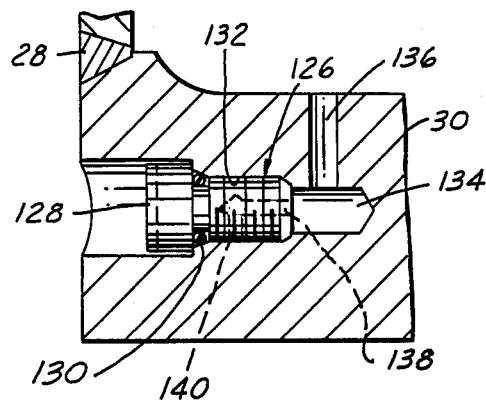
FIG. 6 is a fragmentary sectional view taken generally on line 6—6 of FIG. 2 and illustrating a separate auxiliary valve for relieving gas pressure in the chamber of the gas spring.

As shown in FIG. 6, an auxiliary bleed valve 126 for the spring chamber is provided by a cap screw 128 with an O-ring seal 130 received in a threaded bore 132 which communicates with the chamber via passages 134 and 136. So the chamber will be bled before the cap screw is removed, it has passages 138 and 140 therein where communicate with the atmosphere as soon as the cap screw is loosened sufficiently to disengage the O-ring seal 130.

Setup and Use of Self-Contained Unit

The valve assembly 56 is installed by threading it fully into the cavity to force the gasket 106 into sealing engagement with the cavity end wall 110, and preferably the end of the valve body into metal to metal contact therewith. Then chamber 26 of the spring is charged with gas. This charged can be accomplished by using a conventional tank of a gas such as nitrogen under high pressure connected to the cavity through a conventional pressure regulator with a control valve, flexible hose and a fitting threaded into the cavity. The gas is admitted under sufficient pressure into the cavity 54 to force the poppet valve 88 open and supply gas to the chamber. When the gas in the chamber reaches the desired pressure, the gas supply is shut off and the poppet valve closes to retain the gas in the chamber. The feed line is then bled to the atmosphere and disconnected from the spring. To protect the valve assembly, and provide a secondary self if the valve 88 fails, the cap screw 122 can be threaded into the cavity entrance as shown in FIG. 3.

The gas spring can then be utilized as a pre-charged and self-contained unit. This unit can be re-charged as needed and the pre-charged pressure can be varied as desired within the constrains of the strength of the materials and construction of the gas spring with respect to the maximum working pressure in use when the piston rod is fully displaced or retracted into the cylinder.

When desired, the valve assembly 56 can be readily and easily removed. The screw cap 122 is removed from the cavity to obtain access to the valve assembly. When the blade 97 of a screw driver or other tool is inserted into the slot 82 to turn the valve assembly, as shown in FIG. 4, it depresses the head of the stem 90 which opens the poppet valve to bleed the gas in the chamber to the atmosphere through the poppet valve and the cavity entrance.

In the event the poppet valve 88 does not open to bleed the gas from the chamber, it will still be bled to the atmosphere through the port 74 when during removal of the valve assembly 56 it is rotated sufficiently to disengage the gasket 106 from the cavity end wall 110. Therefore, even if the poppet valve malfunctions, the gas in the chamber will bleed to the atmosphere before the valve assembly 56 is disengaged from the cavity threads. This bleeding prevents the valve assembly 60 from being propelled out of the cavity and creating a risk to injury to the person removing it.

If the chamber is not bled to the atmosphere, it is usually difficult and sometimes impossible to rotate the valve assembly to initiate its removal from the cavity. However, the chamber can always be bled through the auxiliary valve 126.

External Feed Valve Assembly

Figure 8:
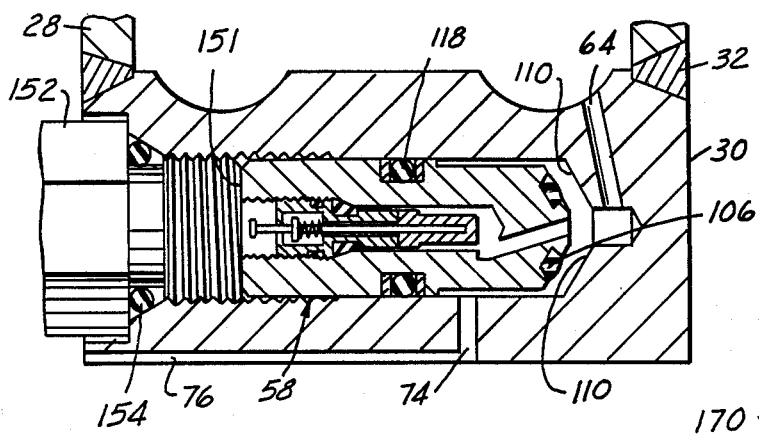
FIG. 8 is a sectional view similar to FIG. 7 illustrating the position of the external valve assembly when it is relieving gas under pressure in the chamber of the spring.

FIGS. 7 and 8 illustrate the valve assembly 58 received in the cavity for use of the spring with an external feed line for supplying gas to the chamber. This valve assembly 58 has a generally cylindrical body 150 slidably received in the bore 66 and removably trapped therein by a feed line connector nipple 152. The nipple has a central through passage and preferably an O-ring 154 received in a groove to provide a seal with the cavity. Preferably, this nipple is a conventional connector. The construction and arrangement of the O-ring 118, seal gasket 106, poppet valve 88 and bores 84 and 86 are all substantially identical to those of the valve assembly 56 and hence will not be described in further detail.

To insure that during charging of the chamber with gas and normal operation of the spring, the gasket 106 is urged into firm sealing engagement with the cavity end wall 110, the effective area of the rear end face 151 of the valve body 150 is greater than that of its front end face. When the valve is in the position, shown in FIG. 7, the front end face effective area is that within or encircled by the gasket 106. Usually, this area is about ¼ to ¾ and preferably about ½ of the effective area of the rear end face of the valve body.

The maximum pressure to which the gas in the chamber can be compressed may be controlled by the valve body 150. When this pressure reaches a maximum value this body is displaced generally axially to disengage the gasket 106 from the cavity end wall 110 (as shown in FIG. 8) so that the chamber 26 bleeds to the atmosphere through the cavity 54, port 74 and groove 76. The pressure at which this body is displaced can be controlled by varying the pressure in the feed line or entrance 60 of the cavity 54 and the ratio of the effective area of the front and rear end faces of the body. For a given valve assembly, this ratio is fixed and hence this maximum pressure can be varied and controlled by the feed line or cavity entrance gas pressure. For example, if this ratio is 2:1, the maximum pressure will be twice the pressure of the gas in the feed line or cavity entrance.

Setup and Use of Spring with an External Source of Gas

For using the spring 20 with an external source of gas, the valve assembly 58 is slidably inserted in the cavity and retained therein by threading the nipple 152 into the cavity entrance. A source of gas, such as a tank of nitrogen under high pressure, is connected to the nipple through a conventional pressure regulator and a flexible hose. When gas is initially admitted it forces the valve assembly 58 to the position shown in FIG. 7 with the gasket 106 in sealing engagement with the cavity end wall 110 and then opens the poppet valve 88 to supply gas to the chamber 26 until the pressure of the gas in the chamber is only slightly less than the pressure of the gas in the feed line, whereupon the poppet valve closes.

In normal use of the spring, the pressure is maintained in the feed line so that the gasket 106 remains in sealing engagement of the cavity end wall due to the difference in the effective area of the opposed ends of the valve assembly. Consequently, in normal use of the spring, the fluctuations in gas pressure in the chamber are not transmitted to and through the gas in the feed line.

This differential effective area also limits and provides a means of varying the maximum pressure to which gas in the chamber can be compressed before it is bled to the atmosphere through the port 74 and groove 76 upon movement of the valve assembly to the left (as shown in FIG. 8). This maximum pressure is a function of the pressure of the gas in the feed line and the ratio of the effective areas of the opposed ends of the valve assembly. For example, if this ratio is 2:1, and the feed line gas pressure is 2,000 psi, then this maximum pressure is 4,000 psi. If desired, after the chamber is initially charged, this maximum pressure can be reduced by thereafter decreasing the gas pressure in the feed line. If it is desired to bleed the gas in the chamber to substantially atmospheric pressure, the gas in the feed line can be bled or otherwise reduced to atmospheric pressure.

Whenever it is desired to change or replace the valve assembly 58, the gas in the feed line is bled to the atmosphere or its pressure otherwise reduced, thereby causing the valve assembly to move to the left (as shown in FIG. 8), to bleed the gas in the chamber to the atmosphere before the nipple or other fitting is removed from the inlet cavity. This insures that the valve assembly will not be propelled out of the cavity and thereby create a risk of injury to the person removing the nipple and valve assembly. In the unlikely even the valve assembly 58 malfunctions and does not bleed the chamber to the atmosphere, the chamber can always be bled to the atmosphere with the auxiliary valve 126.

Bleeding Back Into Inlet

Figure 12:
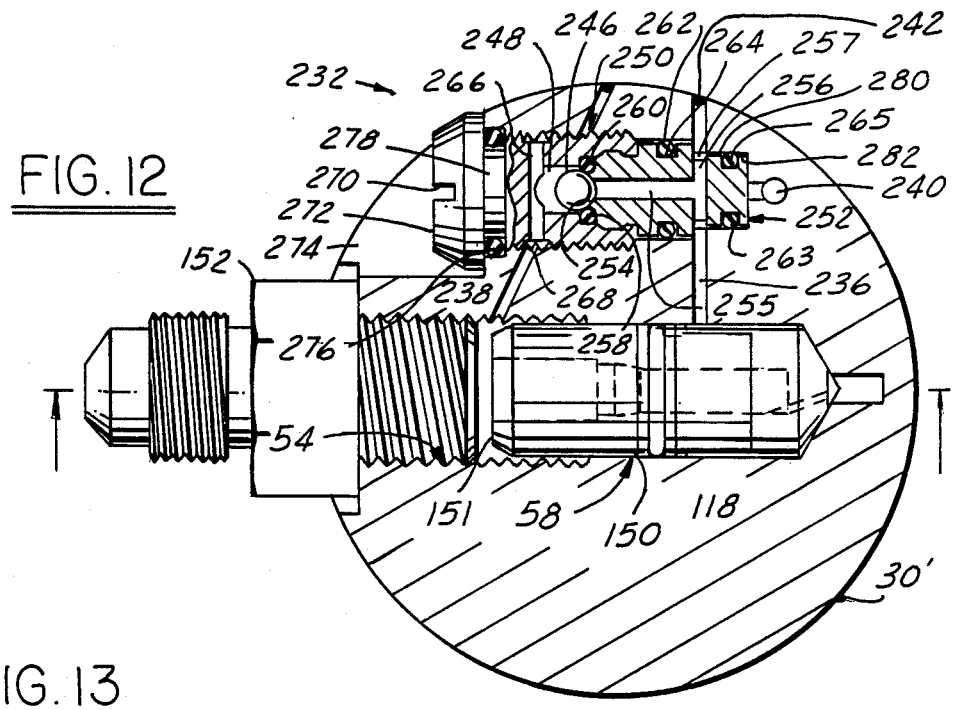
FIG. 12 is a sectional view of a modified gas spring with the valve assembly used when gas is supplied through a feed line from an external source and illustrating a check valve and passages for bleeding gas from the chamber back into the feed line.
Figure 13:
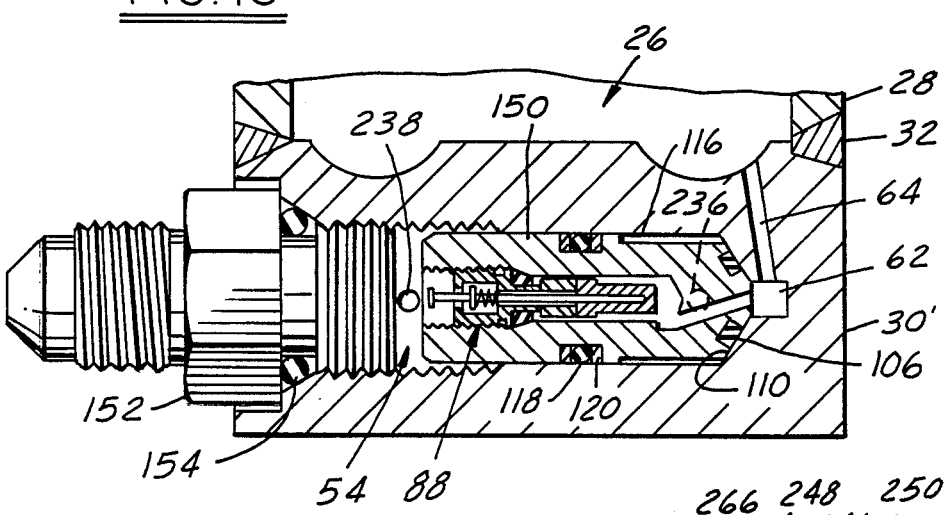
FIG. 13 is a sectional view taken generally on line 13—13 of FIG. 12 and illustrating some of the passages.

FIGS. 12 and 13 illustrate a modified gas spring 230 which is essentially the same as the gas spring 20 except that it has a check valve assembly 232 and associated ports for bleeding gas under pressure in chamber 26 back into the inlet for supplying gas to the chamber. The check valve assembly 232 is received in a threaded counterbore 234 in an end cap 30' and adjacent one end communicates with the valve cavity 54 by a passage 236. Adjacent its other end, the bore 234 also communicates with the valve cavity 54 upstream of the valve 58 and hence the inlet via a passage 238 in the cap. The inner end of the valve cavity also directly communicates with the chamber 26 via a passage 240. If desired, the passages 236, 238 and 240 can be drilled in the cap and the open ends of the passages 236 and 238 closed and sealed by welds 242 and 244.

The valve assembly 232 has a check ball 246 received in a blind bore 248 in a body 250 and trapped therein by a retainer 252. The retainer has a valve seat 254 for the ball and passages 255 and 256 and a groove 257 which interconnect the bore with the passage 236. When the ball is received on the seat 252 a seal is provided by an O-ring 258 received on a shoulder 260 of the retainer. Seals are also provided between the bore and retainer by O-rings 262 and 263 received in grooves 264 and 265 in the retainer. The bore 248 in which the ball is received also communicates with the passage 238 and hence the inlet via a passage 266 and a groove 268 in the body. To facilitate insertion and removal, the body has a slot 270 for receiving a blade of a screwdriver in a head 272 which seats on the bottom of a counterbore 274 which opens into the side face of the cap. When the body is fully threaded into the cap, a seal is provided therebetween by an O-ring 276 received in a groove 278 in the body.

When the gas spring 230 is used with an external source of gas, the valve assembly 58 is filled and operates and functions in essentially the same way as that described in connection with the gas spring 20 and hence its manner of operation will not be repeated. During filling of the chamber and in normal use of the gas spring 230, the gas in the feed line and the inlet has sufficient pressure to keep the valve assembly 232 closed by forcing the ball 246 onto its seat 254 and into sealing engagement with the O-ring 258. Gas in the inlet communicates with the bore 248 and acts on the ball 246 to close the valve through the passage 240, groove 268 and port 266. When valve 58 is retracted from the position shown in FIG. 13 so that pressurized gas bleeds from the chamber 26 it opens the valve assembly 232 and flows back into the inlet and hence the coupling 152 and the feed line. This gas bleeds to the inlet via passage 64, port 62, space 116, passages 236, groove 257, passages 256 and 255, around the ball 246, bore 248, passage 266, groove 268 and passage 240.

The movement of the ball 246 to open and close the check valve is a function of both the pressure of the gases in and bore 248 and the passage 255 and the effective areas of the ball on which they act. The effective area of the ball on which the gas in the bore 248 acts ($A_1$) is essentially the maximum cross sectional area of the ball 246. The effective area of the ball on which the gas in the passage 255 acts ($A_2$) is essentially the cross sectional area of the ball within its generally circular line of contact by the O-ring 258. Usually the area $A_2$ is about ¼ to ¾ and preferably about ½ of the area $A_1$. Preferably, the ratio of $A_1$ to $A_2$ is slightly less than the ratio of the effective area of the back to front of the valve 58 so that flow of gas into and out of chamber 26 is initiated and controlled by the valve 58 without being influenced by the bleed valve assembly 232.

Figure 14:
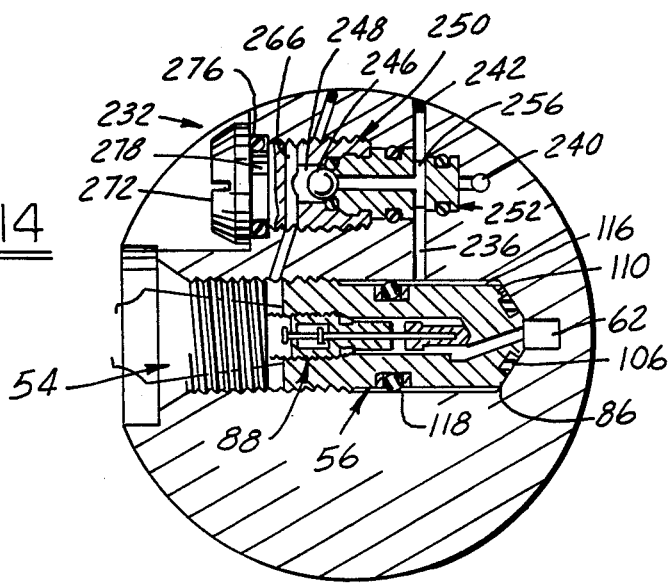
FIG. 14 is a sectional view similar to FIG. 12 of the modified gas spring with the valve assembly used when the gas spring functions as a self-contained unit.

As shown in FIG. 14, the gas spring 230 can be converted to a self-contained unit when valve assembly 56 is inserted in the cavity 54. With the valve assembly 56, gas spring 230 is filled and operates and functions in essentially in the same manner as that described for the gas spring 20 and hence its manner of operation will not be repeated.

Since with valve 56, gasket 106 provides a seal between the port 62 and the space 116, the check valve assembly 232 does not perform a useful or necessary function during initial filling of the chamber 26 and normal operation of the gas spring 230. However, if during removal of valve assembly 56 from a charged gas spring, the poppet valve 88 malfunctions and does not bleed the pressurized gas from the chamber 26 to the atmosphere, it will still bleed to the atmosphere through the check valve 232 and its associated passages. Upon initial retraction of the valve 56, gasket 106 disengages from the end face 110 of the valve cavity so that the pressurized gas in the chamber 26 bleeds to the atmosphere via passage 64, port 62, space 116, passages 238, 236 and 256, around the ball 246, bore 248, port 240, groove 268, port 240, inlet to the cavity 54, and to the atmosphere. This insures the gas in chamber 26 will be fully relieved before the valve 56 is completely unscrewed or its threads disengaged from the cavity, so that upon complete disengagement it cannot be propelled out of the cavity by pressurized gas and thereby present a safety hazard.

Auxiliary Bleed Valve

To insure the chamber 26 can always be manually bled, preferably the valve assembly 232 includes an auxiliary bleed valve 280 provided by the cooperation of the O-ring 263 sealing with the bore 282. As the valve assembly 232 is initially manually turned to unscrew it from the cap, the O-ring 263 disengages from the bore 263 to bleed gas under pressure in the chamber 26 through the check valve and into the inlet of the valve chamber 54. This gas bleeds from the chamber to the inlet via passage 240, bore 282, around O-ring 263, groove 257, passages 256 and 255, around check ball 246, bore 248, passage 266, groove 268, passage 238 and the inlet of chamber 54.

Control for External Source Gas Spring

Figure 10:
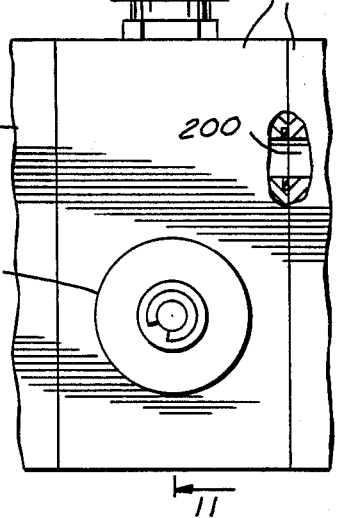
FIG. 10 is a fragmentary side view with a portion broken away and in section of module blocks of the control.
Figure 11:
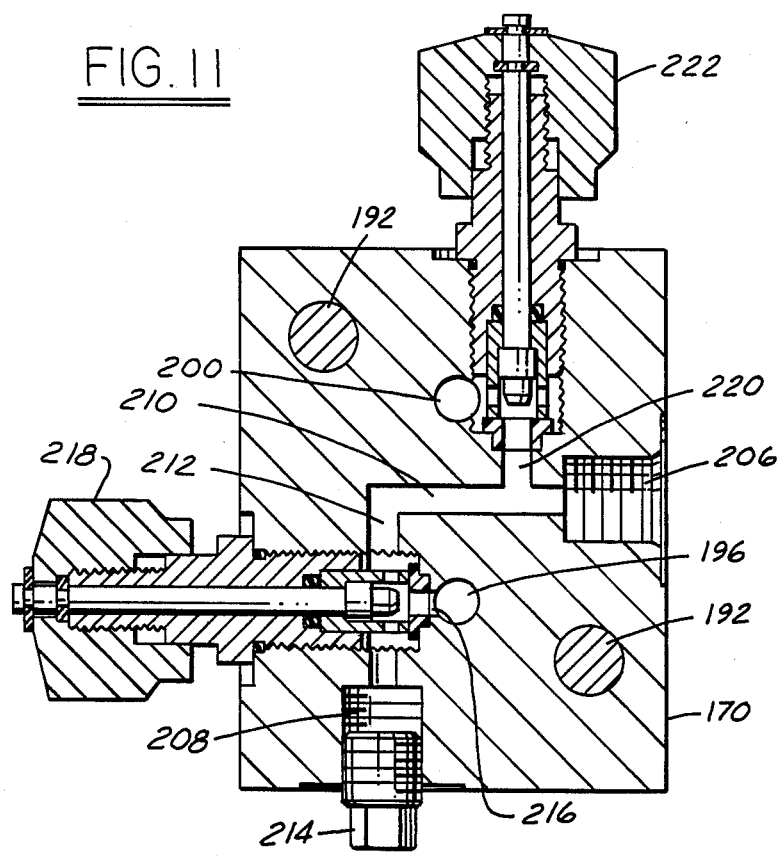
FIG. 11 is a sectional view taken generally on line 11—11 of FIG. 10 of one module block of the control.
Figure 9:
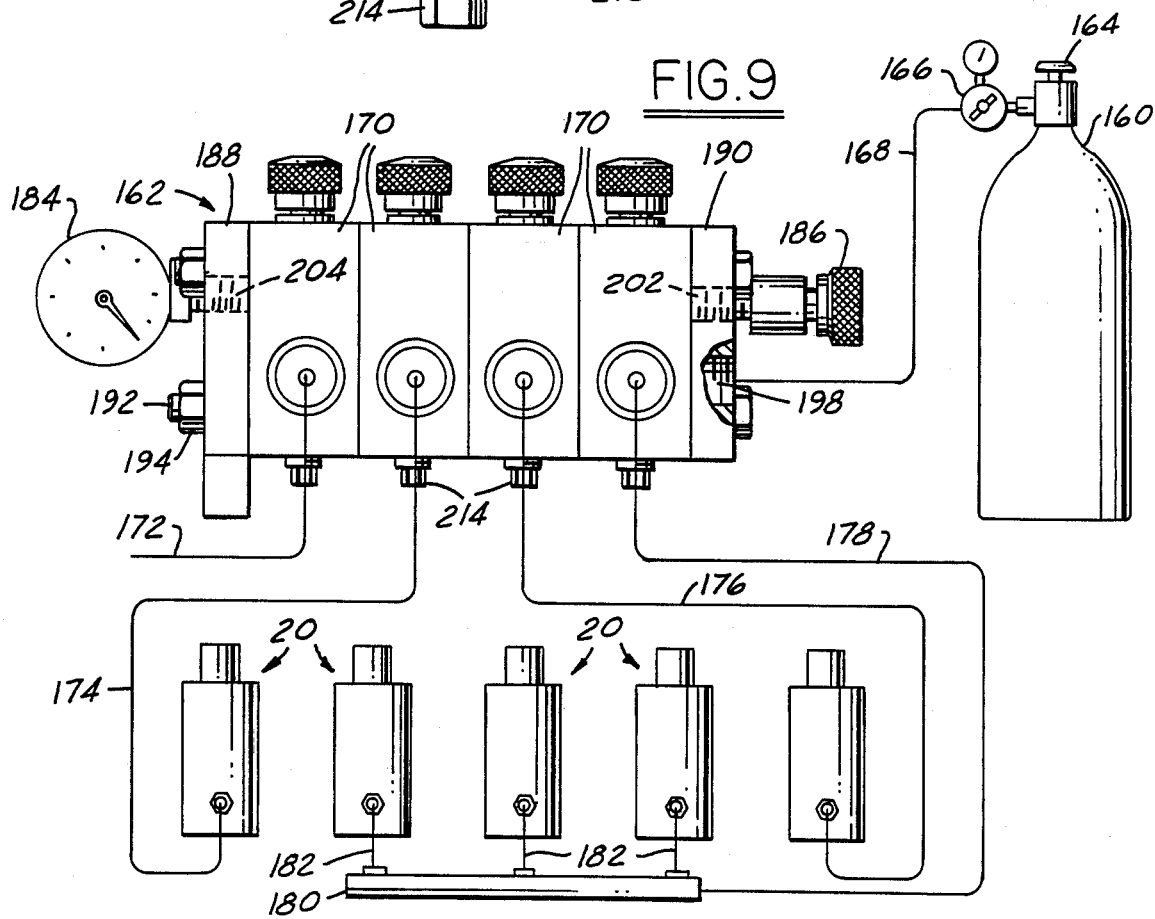
FIG. 9 is a semi-diagrammatic view of several gas springs connected to an external source of pressurized gas through a modular control and feed lines.

A suitable control device for charging and controlling a gas spring with an external valve assembly 58 and a gas source is shown in FIGS. 9-11. As shown in FIG. 9, nitrogen gas under high pressure in excess of 2000 psi is supplied from a tank to a control device 162 through a suitable conventional valve control 164, pressure regulator 166 and feed line 168. The control has four module blocks 170 each of which is connected by a feed line such as a flexible hose to one or more springs. For example, three blocks are each connected to one gas spring by hoses 172, 174, 176 and one block is connected to three gas springs in series through a feed line 178, manifold 180 and hoses 182. The control device permits each feed line to be selectively coupled with the supply tank of gas and to a pressure gauge 184 and a valve 186 for bleeding to the atmosphere.

The four modular blocks 170 are received between a pair of end plates 188, 190 and are secured together in assembled relation by a pair of tie rods 192 and nuts 194.

As shown in FIG. 11, each module block 170 has a supply passage 196 which communicates with an inlet port 198 in one end plate to which the supply line 168 is connected. Each module block also has a gauge and bleed passage 200 which communicates with a port 202 in one block to which the bleed valve 186 is connected and a port 204 in the other block to which a pressure gauge 184 is connected.

Each block has two outlets 206 and 208 interconnected by passages 210 and 212. Usually, one outlet is connected to a feed line and a plug 214 is inserted in the other outlet, although both outlets can be connected to feed lines.

In each block, the supply passage 196 is connected to the outlets through a port 216 and a control valve 218 which can be opened and closed as desired. Similarly, the gauge and bleed passage 200 in each block is connected to the outlets through a separate port 220 and a control valve 222 which can be opened and closed as desired. The control valves can be of conventional construction and operation and hence will not be described in further detail.

In use, the control can be connected to the tank and one or more gas springs by feed lines such as flexible hoses as shown in FIG. 9. In use, gas is supplied to each feed line connected to one of the module blocks by opening and closing its associated valve 218. The pressure gauge can be coupled with one feed line at a time by closing all the other gauge valves 222 and then opening its associated gauge valve 222. If desired, this feed line can then be bled to the atmosphere by closing all supply valves 218 and then opening the bleed valve.

I claim:

1. A combination comprising a gas spring having a rod which can be moved to compress a gas therein comprising, a cylinder defining at least in part a gas chamber, a piston rod slidably received in said cylinder, movable between extended and retracted positions, and constructed and arranged to compress a gas within said chamber when moving from its extended position toward its retracted position, a valve cavity within said cylinder and having an entrance opening to the exterior of said cylinder and an end spaced from said entrance, said cavity being constructed and arranged to interchangeably receive therein either one of a first valve assembly or a second valve assembly, a first valve assembly and a second valve assembly, one of said first valve assembly and said second valve assembly being received in said cavity, port means in said cylinder communicating said cavity with said chamber, all of said port means communicating said cavity with said chamber through said end of said cavity and said cavity communicating with said chamber only through said port means a bleed passage in said cylinder and communicating with said cavity for bleeding off gas under pressure in said chamber through said cavity and bleed passage, said bleed passage opening into said cavity and being spaced from and not opening directly into said chamber, said first valve assembly having a body constructed and arranged to be received in said cavity with a passage therethrough constructed and arranged to communicate with all of said port means and said entrance when said body is received in said cavity, a first valve carried by said first body and constructed and arranged to control the flow of gas through said passage through said first body, said first valve being normally closed and opening in response to gas supplied to the said cavity upstream of said first valve at a pressure substantially greater than the pressure of gas in said chamber and when such upstream pressure is relieved closes to retain gas under pressure in said chamber, a first gasket associated with said first body and constructed and arranged to provide in a first position a seal between said first body and said cavity while simultaneously permitting all of said port means to communicate with said passage in said first body and preventing all of said port means from communicating with said bleed passage and in a second position enabling said port means to communicate with said bleed passage, and releasable means associated with said first body and constructed and arranged to releasably retain said first body in said cavity with said first gasket in such first position and to enable movement of said first gasket to such second position without releasing said first body from said cavity, and said second valve assembly has a second body with generally opposed ends, said second body constructed and arranged to be slidably received in said cavity for movement between first and second spaced apart positions therein and having a passage therethrough constructed and arranged to communicate with all of said port means and said entrance when said second body is received in said cavity, a second valve carried by said second body and constructed and arranged to control the flow of gas through said passage through said second body, said second valve being normally closed and opening in response to gas supplied to said cavity upstream of said second valve at a pressure substantially greater than the pressure of the gas in said chamber and closing when the chamber gas pressure approaches such upstream gas pressure, a second gasket associated with said second body and constructed and arranged to provide in such first position of said second body a seal between said second body and said cavity which both permits all of said port means to communicate with said passage in said second body and prevents all of said port means from communicating with said bleed passage, and in such second position of said second body enables said port means to communicate with said bleed passage, said second body having generally opposed first and second effective areas, said first effective area communication with said cavity upstream of said second valve and said second effective area communicating with said port means downstream of said second valve, said second effective area being smaller than said first effective area and constructed and arranged so that when gas under pressure is applied to said cavity upstream of said second valve and said second body is in its first position, said second body is moved to its second position only when the pressure of the gas in said chamber is substantially greater than such pressure of such gas upstream of said second valve and acting on such first effective area, and removable retainer means constructed and arranged to retain said second body in said cavity while permitting said second body to move between said first and second positions thereof, whereby when said first valve assembly and releasable means are received in said cavity the gas spring can be utilized as a self-contained unit and when said second valve assembly and retainer means are received in said cavity such as gas spring can be utilized with an external source of gas under pressure.

2. The gas spring of claim 1 which also comprises a second gasket carried by said first body and constructed and arranged to provide a seal between said first body and said cavity downstream of said bleed passage.

3. The gas spring of claim 1 which also comprises a second gasket carried by said second body and constructed and arranged to provide a seal between said second body and said cavity downstream of said bleed passage.

4. The gas spring of claim 1 wherein said cavity has a threaded portion adjacent said entrance thereof and said releasable means comprises a mating threaded portion on said first body.

5. The gas spring of claim 1 which also comprises a recess in said first body constructed and arranged to receive a tool for removing said first body from said cavity, and a stem normally disposed in part in said recess and operably connected to said first valve to open said first valve when said stem is depressed by the tool being inserted in said recess, whereby inserting a tool in said recess depresses said stem to open said first valve and thereby bleed any gas under pressure in said chamber to the atmosphere through said passage in said first body and said entrance of said cavity.

6. The gas spring of claim 5 wherein said cavity also comprises a threaded portion adjacent said entrance and said releasable means comprises a mating threaded portion on said first body.

7. The gas spring of claim 1 which also comprises an annular groove in an end of said first body and encircling both said passage therethrough and all of port means, said groove having a base and a pair of spaced apart and generally upstanding side walls with the side wall adjacent said passage being inclined at an acute included angle to said base of said groove, and said first gasket being circumferentially continuous, received in said groove and having a base and upstanding side walls complementary to said base and upstanding side walls of said groove, whereby the said first gasket is at least in part retained in said groove by said side wall being inclined at an acute included angle to the base of said groove.

8. The gas spring of claim 7 wherein said first gasket is also secured in said groove in said first body by an adhesive.

9. The gas spring of claim 1 which also comprises an annular groove in an end of said second body and encircling both said passage therethrough and said port, said groove having a base and a pair of spaced apart and generally upstanding side walls with the side wall adjacent said passage being inclined at an acute included angle to said base of said groove, and said second gasket being circumferentially continuous, received in said groove and having a base and upstanding side walls complementary to said base and upstanding side walls of said groove, whereby said second gasket is at least in part retained in said groove by said side wall being inclined at an acute included angle to the base of said groove.

10. The gas spring of claim 9 wherein said second gasket is also secured in said groove in said second body by an adhesive.

11. The gas spring of claim 1 wherein said first valve is disposed in said passage through said first body and comprises a poppet valve having a stem slidably received in a housing and connected to a valve head movable to open and close said first valve, and said first body has a positive stop disposed under said valve head to limit the extent of travel of said stem when said poppet valve opens so tht said stem does not strike said housing, whereby damage of the said poppet valve is avoided.

12. The gas spring of claim 11 wherein said poppet valve is a conventional core valve.

13. The gas spring of claim 1 wherein said second valve is disposed in said passage through said second body and comprises a poppet valve having a stem slidably received in a housing and connected to a valve head movable to open and close said second valve, and said second body has a positive stop disposed under said valve head to limit the extent of travel of said stem when said poppet valve opens so that said stem does not strike said housing, whereby damage of said poppet valve is avoided.

14. The gas spring of claim 13 wherein said poppet valve is a core valve.

15. The gas spring of claim 1 wherein said cavity also comprises a threaded portion adjacent said entrance and said removable retainer means comprises a nipple having threads mating with said threaded portion of said cavity, a stop surface constructed and arranged to bear on said second body when said second body is in its second position and to be spaced therefrom when said second body is in its first position, and a gas passage through said nipple.

16. The gas spring of claim 15 wherein said nipple is constructed and arranged for connecting a feed line to said cavity.

17. The gas spring of claim 16 which also comprises an annular gasket carried by said nipple and constructed and arranged to provide a seal between said nipple and said cavity when said nipple is secured in said cavity.

18. The gas spring of claim 1 wherein said bleed passage also communicates with said valve cavity downstream of its entrance and upstream of said first and second valve assemblies when received therein, and also comprises a third valve in said gas spring, operable connected to said bleed passage and which closes to prevent gas from said entrance flowing through said bleed passage to said chamber and opens to permit gas from said chamber to flow through said bleed passage to said entrance.

19. The gas spring of claim 18 wherein said third valve comprises a check valve which when closed has a first effective area exposable to gas under pressure from said chamber which is in the range of ¼ to ¾ of a second effective area generally opposed to said first effective area and exposable to gas under pressure in said entrance of said valve cavity.

20. The gas spring of claim 19 wherein the ratio of said first effective area to said second effective area of said check valve is less than the ratio of said first effective area to said second effective area of said second valve.

21. The gas spring of claim 1 which also comprises a second valve cavity in said cylinder, having an entrance opening to the exterior of said cylinder, and constructed and arranged to removably receive a bleed valve assembly therein, said bleed passage communicating with said first valve cavity downstream of its entrance and upstream of said first and second valve assemblies when received therein, a bleed valve assembly removably received and releasably retained in said second valve cavity and having a third valve operable connected to said bleed passage and which closes to prevent gas from said entrance flowing through said bleed passage to said chamber and opens to permit gas from said chamber to flow through said bleed passage to said entrance, a second port communicating with said gas chamber and said second valve cavity, and a fourth valve carried by said bleed valve assembly which closes to prevent gas under pressure in said chamber from flowing out of said chamber through said second port when said bleed valve assembly is fully received and retained in said second cavity and opens to permit gas under pressure in said chamber to flow out of said chamber through said second passage and bleed into said first valve cavity downstream of its entrance and upstream of said first and second valve assemblies when received therein and after removal of said bleed valve assembly from said second cavity begins and before it is completely disengaged from said cylinder for removal from said second valve cavity.

22. The gas spring of claim 21 wherein when said fourth valve opens the gas under pressure in said cylinder bleeds through said third valve.

23. The gas spring of claim 1 wherein said valve cavity has a generally cylindrical sidewall, said body of said first valve assembly is generally cylindrical and has a pair of generally opposed ends with said passage therethrough extending through both of said ends, said first gasket has an annular and circumferentially continuous ring carried by said body adjacent one end thereof which encircles both such opening of said passage of said first body at one end thereof, and the opening of all of said port means through said end of said cavity, and bears on said end of said cavity when said first body is in said first position in said cavity.

24. The gas spring of claim 23 which also comprises a circumferentially continuous groove in said first body between said opposed ends thereof and downstream of said bleed passage, and a circumferentially continuous ring of an elastomeric material received in said groove and constructed and arranged to provide seal between said first body and said cavity downstream of said bleed passage when said first valve assembly in its first position in said cavity.

25. The gas spring of claim 23 which has only one said port communicating said cavity with said chamber.

26. The gas spring of claim 23 wherein said valve cavity has a generally cylindrical sidewall, said body of said second valve assembly is generally cylindrical and has a pair of generally opposed ends with said passage therethrough extending through both of said ends, said second gasket has an annular and circumferentially continuous ring carried by said body adjacent one end thereof which encircles both such opening of said passage of said second body through such one end thereof and the opening of all of said port means through said end of said cavity, and bears on said end of said cavity when said second body is in said first position in said cavity.

27. The gas spring of claim 26 which also comprises a circumferentially continuous groove in said second body between said opposed ends thereof and downstream of said bleed passage, a circumferentially continuous ring of an elastomeric material received in said groove and constructed and arranged to provide a seal between said second body and said cavity downstream of said bleed passage when said first valve assembly is in its second position in said cavity.

28. The gas spring of claim 26 which has only one said port communicating said cavity with said chamber.

29. A gas spring system comprising
(a) at least two gas springs each having a rod which can be moved to compress a gas therein,
(b) each said gas spring having a cylinder defining at least in part a gas chamber, a piston rod slidably received in said cylinder, movable between extended and retracted positions, and constructed and arranged to compress a gas within said chamber when moving from its extended position toward its retracted position, a valve cavity within said cylinder having an entrance opening to the exterior of said cylinder and an end spaced from said entrance, said cavity being constructed and arranged to receive therein either one of a first valve assembly and a second valve assembly, port means in said cylinder communicating said cavity with said chamber, all of said port means communicating said cavity with said chamber through said end of said cavity and said cavity communicating with said chamber only through said port means, a bleed passage in said cylinder communicating with said cavity for bleeding off gas under pressure in said chamber through said cavity and bleed passage, said bleed passage opening into said cavity and being spaced from and not opening directly into said chamber, said first valve assembly having a body constructed and arranged to be received in said cavity with a passage therethrough constructed and arranged to communicate with all of said port means and said entrance when said body is received in said cavity, a first valve carried by said first body and constructed and arranged to control the flow of gas through said passage through said first body, said first valve being normally closed and opening in response to gas supplied to the said cavity upstream of said first valve at a pressure substantially greater than the pressure of gas in said chamber and when such upstream pressure is relieved closes to retain gas under pressure in said chamber, a first gasket associated with said first body and constructed and arranged to provide in a first position a seal between said first body and said cavity while simultaneously permitting all of said port means to communicate with said passage in said first body and preventing all of said port means from communicating with said bleed passage and in a second position enabling said port means to communicate with said bleed passage, and releasable means associated with said first body and constructed and arranged to releasably retain said first body in said cavity with said first gasket in such first position and to enable movement of said first gasket to such second position without releasing said first body from said cavity, and said second valve assembly has a second body constructed and arranged to be slidably received in said cavity for movement between first and second spaced apart positions therein and having a passage therethrough constructed and arranged to communicate with all of said port means and said entrance when said second body is received in said cavity, a second valve carried by said second body and constructed and arranged to control the flow of gas through said passage through said second body, said second valve being normally closed and opening in response to gas supplied to said cavity upstream of said first valve at a pressure substantially greater than the pressure of the gas in said chamber and closing when the chamber gas pressure approaches such upstream gas pressure, a second gasket associated with said second body and constructed and arranged to provide in such first position of said second body a seal between said second body and said cavity while both permitting all of said port means to communicate with said passage in said second body and preventing all of said port means from communicating with said bleed passage and in such second position of said second body enables said port means to communicate with said bleed passage, said second body having generally opposed first and second effective areas, said first effective area communicating with said cavity upstream of said second valve and said second effective area communicating with said port means downstream of said second valve, said second effective area being smaller than said first effective area and constructed and arranged so that when gas under pressure is applied to said cavity upstream of said second valve and said second body is in its first position, said second body is moved to its second position only when the pressure of the gas in said chamber is substantially greater than such gas pressure upstream of said second valve and acting on such first effective area, and removable retainer means constructed and arranged to removably retain said second body in said cavity while permitting said second body to move between said first and second positions thereof, (c) said second valve assembly being received in said cavity of each of said gas springs, and (d) a modular control device for supplying gas under pressure to said gas springs comprising a pair of end plates, a supply port in one of said end plates, a gauge port in one of said end plates, a pressure gauge connected to said gauge port, a bleed port in one of said end plates, a bleed valve connected to said bleed port, at least two module blocks received between said end plates and disposed in generally opposed face to face relationship to each other, a supply passage through each of said module blocks and communicating with said inlet port, a gauge and bleed passage through each of said module blocks and communicating with both said gauge ports and said bleed port, an outlet in each of said module blocks constructed and arranged for connection to at least one of said gas springs, a first control valve in each of said module blocks constructed and arranged to selectively connect and disconnect said supply passage with said outlet of its associated block, and a second control valve in each of said module blocks constructed and arranged to selectively connect and disconnect said gauge and bleed passage with said outlet of its associated module block, whereby the first and second control valves of each module block can be manipulated to control the supplying of gas under pressure to a gas spring connected to the outlet thereof, to determine the pressure of gas supplied to such spring, and to bleed to a low pressure point such as the atmosphere gas in a feed line to such gas spring connected to such outlet of such block 30. The gas spring system of claim 20 wherein said bleed passage also communicates with said valve cavity downstream of its entrance and upstream of said first and second valve assemblies when received therein, and also comprises a third valve in said gas spring, operably connected to said bleed valve and which closes to prevent gas from said entrance flowing through said bleed passage to said chamber and opens to permit gas from said chamber to flow through said bleed passage to said entrance of said valve cavity.

31. The gas spring system of claim 30 wherein said third valve comprises a check valve which when closed has a first effective area exposable to gas under pressure from said chamber which is in the range of $\frac{1}{4}$ to $\frac{3}{4}$ of a second effective area generally opposed to said first effective area and exposble to gas under pressure in said entrance of said valve cavity.

32. The gas spring system of claim 31 wherein the ratio of said first effective area to said second effective area of said check valve is less than the ratio of said first effective area to said second effective area of said second valve.

33. The gas spring of claim 29 wherein said valve cavity has a generally cylindrical sidewall, and said body of said second valve assembly is generally cylindrical and has a pair of generally opposed ends with said passage therethrough extending through both of said ends, said second gasket has an annular and circumferentially continuous ring carried by such body adjacent one end thereof which encircles both such opening of said passage of said second body through such one end thereof and the opening of all of said port means through said end of said cavity, and bears on said end of said cavity when said second body is in said first position in said cavity.

34. The gas spring of claim 33 which also comprises a circumferentially continuous groove in said second body between said opposed ends thereof and downstream of said bleed passage, and a circumferentially continuous ring of an elastomeric material received in said groove and constructed and arranged to provide a seal between said second body and said cavity downstream of said bleed passage when said second valve assembly is in its second position in said cavity.

35. The gas spring of claim 24 which has only one said port communicating said cavity with said chamber.

36. For a gas spring having a cylinder defining at least in part a gas chamber, a piston rod slidably received in said cylinder, movable between extended and retracted positions and constructed and arranged to compress a gas within such chamber when moving from its extended position toward its retracted position, a valve cavity within said cylinder having an entrance opening to the exterior of said cylinder and an end spaced from said entrance, said cavity being constructed and arranged to interchangeably receive therein either one of a first valve assembly or a second valve assembly, a port in said cylinder communicating said cavity with said chamber through said end of said cavity and said cavity communicating with said chamber only through said port, and a bleed passage in said cylinder and communicating with said cavity for bleeding off gas under pressure in said chamber through said cavity and bleed passage, said bleed passage opening into said cavity and being spaced from and not opening directly into said chamber; a first valve assembly and a second valve assembly, said first valve assembly comprising a body constructed and arranged to be received in said cavity with a passage therethrough constructed and arranged to communicate with said port and said entrance when said body is received in said cavity, a first valve carried by said first body and constructed and arranged to control the flow of gas through said passage through said first body, said first valve being normally closed and opening in response to gas supplied to the said cavity upstream of said first valve at a pressure substantially greater than the pressure of gas in said chamber and when such upstream pressure is relieved closes to retain gas under pressure in said chamber, a first gasket carried by said first body and constructed and arranged to provide in a first position a seal between said first body and said cavity while simultaneously permitting said port to communicate with said passage in said first body and preventing said port from communicating with said bleed passage and in a second position enabling said port to communicate with said bleed passage, and releasable means on said first body and constructed and arranged to releasably retain said first body in said cavity with said first gasket in such first position and to enable movement of said first gasket to such second position without releasing said first body from said cavity; and said second valve assembly comprising a second body constructed and arranged to be slidably received in said cavity for movement between first and second spaced apart positions therein and having a passage therethrough constructed and arranged to communicate with said port and said entrance when said second body is received in said cavity, a second valve carried by said second body and constructed and arranged to control the flow of gas through said passage through said second body, said second valve being normally closed and opening in response to gas supplied to said cavity upstream of said first valve at a pressure substantially greater than the pressure of the gas in said chamber and closes when the chamber gas pressure approaches such upstream gas pressure, a second gasket associated with said second body and constructed and arranged to provide in such first position of said second body a seal between said second body and said cavity while simultaneously permitting said port to communicate with said passage in said second body and preventing said port from communicating with said bleed passage, and in such second position of said second body enabling said port to communicate with said bleed passage, said second body having generally opposed first and second effective areas, said first effective area constructed and arranged to communicate with said cavity upstream of said second valve and said second effective area constructed and arranged to communicate with said port downstream of said second valve, and said second effective area being smaller than said first effective area and constructed a and arranged so that when gas under pressure is applied to said cavity upstream of said second valve and said second body is in its first position, said second body is moved to its second position only when the pressure of the gas in said chamber is substantially greater than such pressure of such gas upstream of said second valve and acting on such first effective area, whereby when said first valve assembly and releasable means are received in said cavity the gas spring can be utilized as a self-contained unit and, when said second valve assembly is received in said cavity such gas spring can be utilized with an external source of gas under pressure.

37. The valve assemblies of claim 36 which also comprise a recess in said first body constructed and arranged to received a tool for removing said first body from such cavity, and a stem normally disposed in part in said recess and operably connected to said first valve to open said first valve when said stem is depressed by the tool being inserted in said recess, whereby inserting a tool in said recess depresses said stem to open said first valve and thereby bleed any gas under pressure in such chamber to the atmosphere through said passage in said first body and such entrance of such cavity.

38. The valve assemblies of claim 37 wherein said cavity has a threaded portion adjacent such entrance and said releasable means comprises a mating threaded portion of said first body.

39. The valve assemblies of claim 36 which also comprises an annular groove in an end of said first body and encircling both said passage therethrough and such port, said groove having a base and pair of spaced apart and generally upstanding side walls with the side wall adjacent said passage being inclined at an acute included angle to said base of said groove, and said first gasket being circumferentially continuous, received in said groove and having a base and upstanding side walls complementary to said base and upstanding side walls of said groove, whereby said first gasket is at least in part retained in said groove by said side wall being inclined at an acute included angle to the base of said groove.

40. The valve assemblies of claim 36 which also comprises an annular groove in an end of said second body and encircling both said passage therethrough and such port, said groove having a base and pair of spaced apart and generally upstanding side walls with the side wall adjacent said passage being inclined at an acute included angle to said base of said groove, and said second gasket being circumferentially continuous, received in said groove and having a base and upstanding side walls complementary to said base and upstanding side walls of said groove, whereby said second gasket is at least in part retained in said groove by said side wall being inclined at an acute included angle to the base of said groove.

41. The valve assemblies of claim 36 wherein said first valve is disposed in said passage through said first body and comprises a poppet valve having a stem slidably received in a housing and connected to a valve head movable to open and close said first valve, and said first body has a positive stop disposed under said valve head to limit the extent of travel of said stem when said poppet valve opens so that said stem does not strike said housing, whereby damage of said poppet valve is avoided.

42. The valve assemblies of claim 36 wherein said second valve is diposed in said passage through said second body and comprises a poppet valve having a stem slidably received in a housing and connected to a valve head movable to open and close said second valve, and said second body has a positive stop disposed under said head to limit the extent of travel of said stem when said poppet valve opens so that said stem does not strike said housing, whereby damage of said poppet valve is avoided.

* * * * *